L. S. DEMING.
Automatic Gate.
No. 39,798.
Patented Sept. 8, 1863.
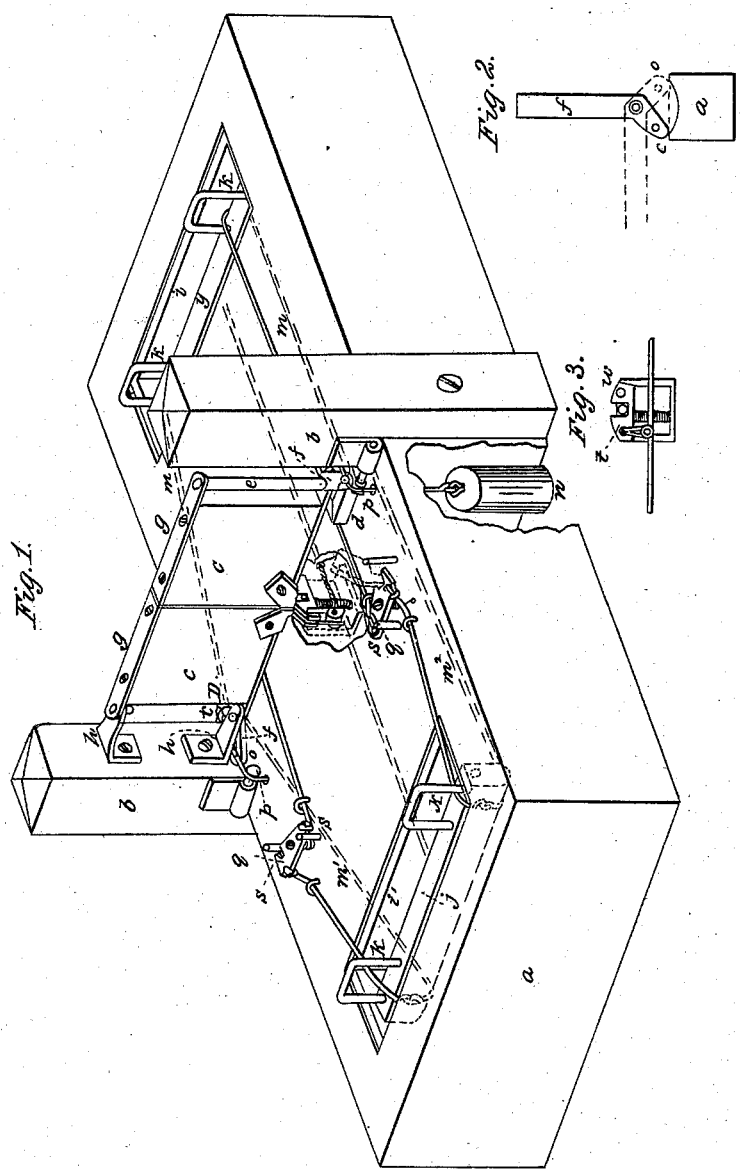
Witnesses:
Inventor:

UNITED STATES PATENT OFFICE.

LEVI S. DEMING, OF NEWINGTON, CONNECTICUT.

IMPROVEMENT IN AUTOMATIC GATES.

Specification forming part of Letters Patent No. 39,798, dated September 8, 1863; antedated April 18, 1863.

*To all whom it may concern:*

Be it known that I, LEVI S. DEMING, of Newington, county of Hartford, and State of Connecticut, have invented a certain new and useful Improvement in Self-Operating Gates, &c.; and I do hereby declare that the same is described and represented in the following specification and drawings, and to enable others skilled in the art to make and use the same, I will proceed to describe the construction and operation, referring to the drawings, in which the same letters indicate like parts in each of the figures.

The nature of this improvement in gates consists, principally, in so constructing and arranging the parts in the ground as to do away with the ordinary frame-work as in common use, thereby greatly lessening the expense of construction and much trouble in arranging parts so as to render them simple and sure in their operation.

The great expense of procuring self-operating gates heretofore, together with the imperfection of their operation, has rendered them almost useless.

The object of this improvement is to remove the existing objections to self-operating gates, and to provide a gate at a small expense wherever there is a passage from one portion of a farm to another at a trifling more expense than the common gate, and a gate also which may be made in equally good style with any other in use.

In the accompanying drawings, *a* represents the ground into which the posts and operating parts are placed. *b* are the posts of the fence, placed each side of the gate-ways. *c* are the gates, one of which is hung by its hinges directly to the fence-post *b*, and the other hung by its hinges upon a perpendicular rod, *e*, one end of which is secured into a post, *d*, set in the ground. The upper strap and hinge, *g h*, are much like those in common use. The lower strap or hinge, *f*, (see Fig. 2,) which is secured to the gates, is made with an arm projecting back from the fulcrum, upon which it turns at an angle of about forty-five degrees to a point, *o*, at which the connection or operating chain or cord is attached, the object of which angle is to apply the power with the greatest effect from the time the gate commences to open till it makes a quarter-turn and to produce the same effect in the return-motion of the gate, thus producing an easy and sure motion with the least amount of power than can be produced if the cord or chain were attached at a point the same distance inside of the fulcrum and in line with the hinge or gate.

*i* are boxes placed in the ground, which may be made in length equal to the width of the carriage-way, or one-fourth part of that length, only that they must be placed at a proper distance inside and outside of the gate-way, and so that one of the wheels of a carriage will strike the arms (elevated above the surface of the ground, secured in the axle placed therein) as it travels along the way. Inside of these boxes *i* are arranged eccentric or weighted axles, or a timber, the journals on which it oscillates being inserted near its upper edge so as to hold the elevated arms *k* perpendicular when not in use. The arms *k* are secured to the axles *j*, and extend upward a suitable distance above the surface of the ground, so that in their forward and backward movements (produced by the action of a wheel, &c.) they will open the gates by means of their rod or chain connections *m*, while the gates are closed by the counteraction of weights *n*, having cord or chain connections. Said cord or chain is attached to the projecting end of the hinge *f* at *o* and carried nearly horizontal and parallel with the track or way over a pulley, *p*, down and secured to weights *n*, which act in their proper time to close the gates. The connections *m* are also connected to the end of the hinges *f* at *o*, and are conducted (with or without pulleys) under ground to the under side of the axle *i*, and secured thereto to open (by the action thereof) the gates while the carriage is traveling over them. The cord or chain *m'*, attached to the axle *i'*, passes through the ground over a pulley, *r*, and back to the end of the hinge *o*.

*q* are spring latches, the shape of which will be fully understood from the drawings, which are secured (in practice) by a pivot to a timber set in the ground, and provided with springs to cause them to self-operate when the gates are thrown open, and are also provided with holes *s*, to receive a rod or other connection, one to extend to axle *i* and the other to *i'*, or their equivalents, to release the gates and allow them to swing together just as the carriage is passing from the gates in either direction.

Fig. 3 shows a double spring-latch device for catching and holding the gates together when shut.

I secure this device in a box or timber placed in the ground where desired, which is made of a metallic plate, *t*, hung on a pivot, *u*, at one end, and having notches cut on the upper edge and near the center to receive the edge of the plates *v*. The front edge of these latches are made inclined, so that as the gates swing together the plates will strike the lowest portion or front end of the latches and depress them and allow the plates to move forward into the notches. The connections and the mode of releasing them should be the same as that of releasing the side latches.

After all the parts are properly put together in the ground and ready for operation, it will be seen that a person riding in a carriage may drive up toward the gate till the wheels strike the arms *k*, the first motion of which (the arms *k*, or their equivalents) releases the latches *t* and pulls upon the chain or rods *m*, connected to the hinge at *o*, and are caught and held by the latches *q* until the carriage passes the gates and the wheels strike the opposite arms, which also release the latches and allow the gates to close by the action of the weights *n*. The same action is produced going in either direction in or out of the gate.

By this improvement I am enabled to construct a cheap and useful gate, which I have found from its practical workings to be perfect in its operation, and not liable to get out of order.

I believe I have shown the nature, construction, and operation of my improvement, so as to enable a person skilled in the art to make the same therefrom.

I claim—

In combination, the gates *c* with the angle-hinges, Fig. 2, double latch, Fig. 3, side latches, *q*, axles *j*, boxes *i*, connections *m*, weights *n*, arranged and operating without ground framework, substantially as described.

In testimony whereof I have hereunto set my hand and seal this 30th day of June, 1862.

LEVI S. DEMING. [L. S.]

Witnesses:
J. H. HUBBARD,
JEREMY W. BLISS.